June 18, 1940. R. J. THOMPSON Re. 21,484

AIRCRAFT

Original Filed May 18, 1938 3 Sheets-Sheet 1

INVENTOR
RICHARD J. THOMPSON
BY
Munn, Anderson & Liddy
ATTORNEYS

June 18, 1940. R. J. THOMPSON Re. 21,484

AIRCRAFT

Original Filed May 18, 1938 3 Sheets-Sheet 2

INVENTOR
RICHARD J. THOMPSON
BY
Munn, Anderson & Liddy
ATTORNEYS

June 18, 1940. R. J. THOMPSON Re. 21,484
AIRCRAFT
Original Filed May 18, 1938 3 Sheets-Sheet 3
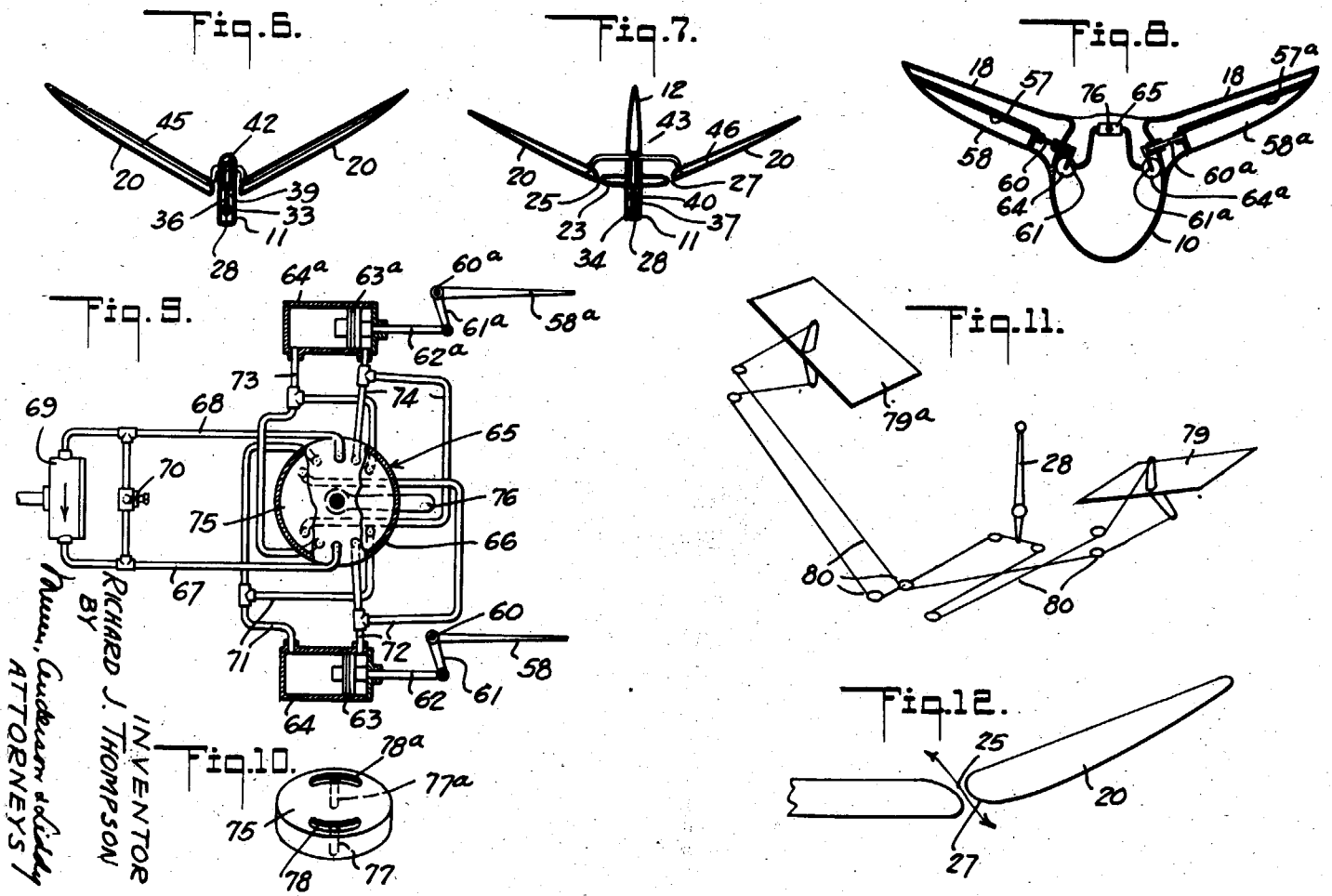

Patented June 18, 1940

Re. 21,484

UNITED STATES PATENT OFFICE 21,484

AIRCRAFT

Richard J. Thompson, Bakersfield, Calif., assignor of sixty-two and one-half per cent to C. N. White and thirty-seven and one-half per cent to Lawson L. Lowe, both of Bakersfield, Calif.

Original No. 2,167,143, dated July 25, 1939, Serial No. 208,650, May 18, 1938. Application for reissue April 15, 1940, Serial No. 331,872

15 Claims. (Cl. 244—13)

This invention relates generally to aeronautics, and more particularly to heavier-than-air craft.

An object of this invention is to provide a heavier-than-air craft which is structurally characterized by lifting surfaces whose chords greatly exceed their spans, and by relatively long keel-forming surfaces on the fuselage of the craft, whereby to materially increase directional stability, reduce head resistance, and cheapen as well as simplify the construction of the craft by enabling the wing spars to be shortened and full cantilever bracing simplified, all to the end of producing an aircraft which will be inherently stable and positively spin-proof.

Another object of the invention is to provide a heavier-than-air craft, the wings of which can be variably cambered under the control of the pilot, in order to obtain a maximum camber for maximum lift in taking off or climbing, and a minimum camber for minimum lift with a reduction in parasitic drag in flight, so as to effect an increase in the speed of the craft, all in such manner as to permit the wings to be constructed as flat surfaces capable of being flexed to obtain the desired camber.

A further object of the invention is to provide an aircraft which, by its novel wing and fuselage structures, enables the motor or motors to be located amidship without materially affecting the center of gravity or the distribution of weights; enables loads to be safely distributed over the full length of the structure so as to increase the safety factor of the ship and make more usable space available; and permits the craft to be placed in a stalled attitude and to lose altitude at a controlled speed without any danger of spinning, all while enabling the pilot at any time during such a maneuver to regain fast forward flight without the necessity of nosing the ship downwardly with the attendant loss of altitude.

Another object of the invention is to provide an aircraft in which the wing structure embodies means enabling the craft to be safely stalled into a landing, or to be slipped out of a stall by destroying the lift on at least a portion of one wing or the other with the consequent creation of a highly rarefied air pocket under the respective wing.

Still another object of the invention is to provide an aircraft wherein the relationship of its horizontal stabilizer, elevators and/or wing tips enables full control of the craft to be maintained at or below a stalling speed, due to a Venturi action created in clearance slots or spaces between these elements, which action sets up a current of high velocity air permitting the craft to settle vertically while retaining control of the elevators, so that by opening the throttle and moving the stick forward, forward speed may be regained.

With these and other objects in view, one form of the invention will be described in the following specification, and the novel features pointed out in the claims.

In the accompanying drawings.

Figures 1, 2, 5:
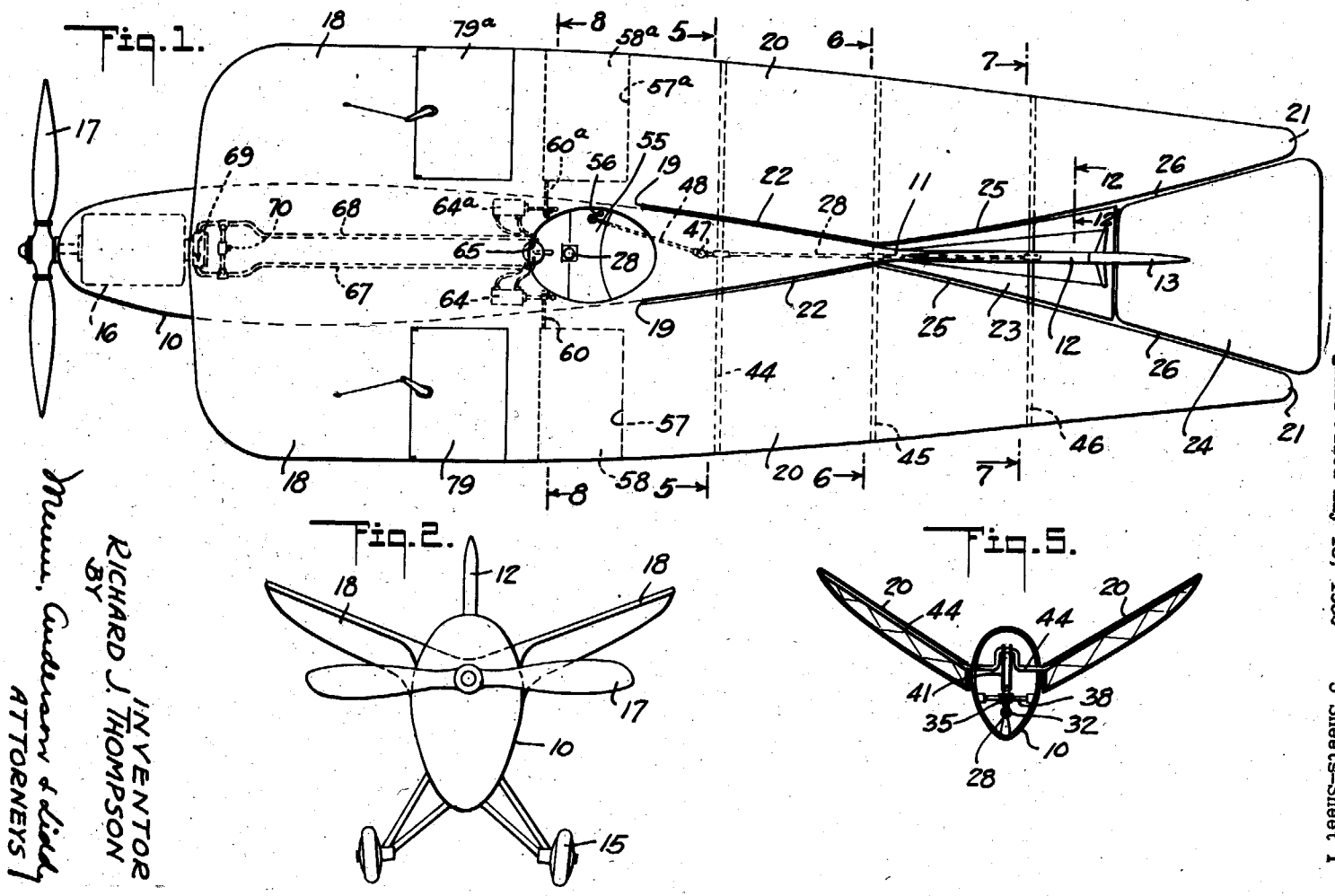
Fig. 1 is a plan view of an aircraft embodying this invention.
Fig. 2 is a view of the aircraft in front elevation.
Figure 3:
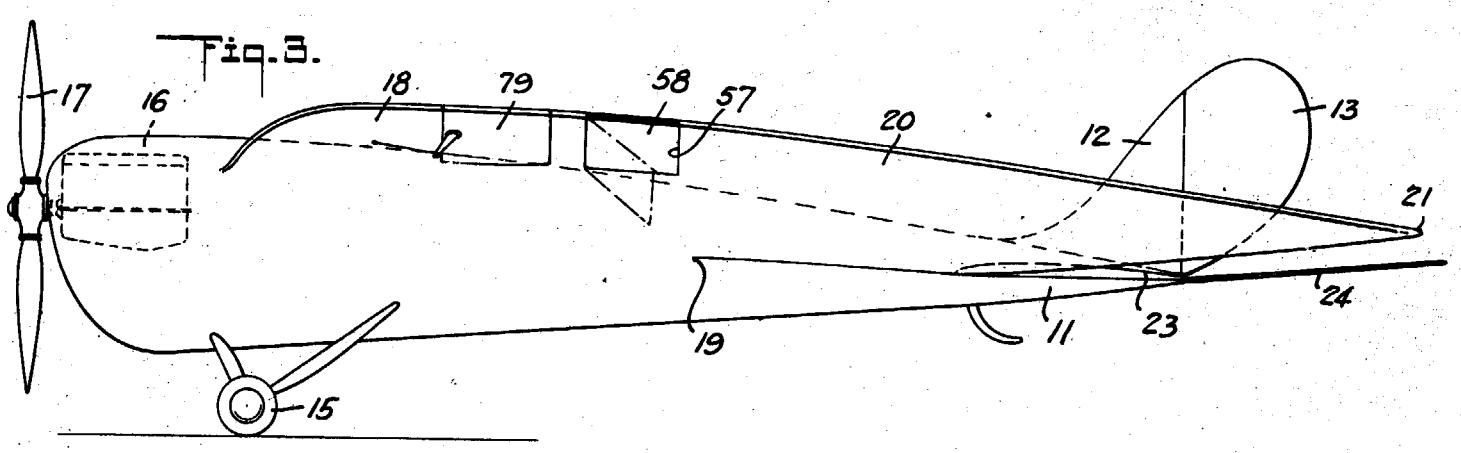
Fig. 3 is a view of the aircraft in side elevation.
Figure 4:
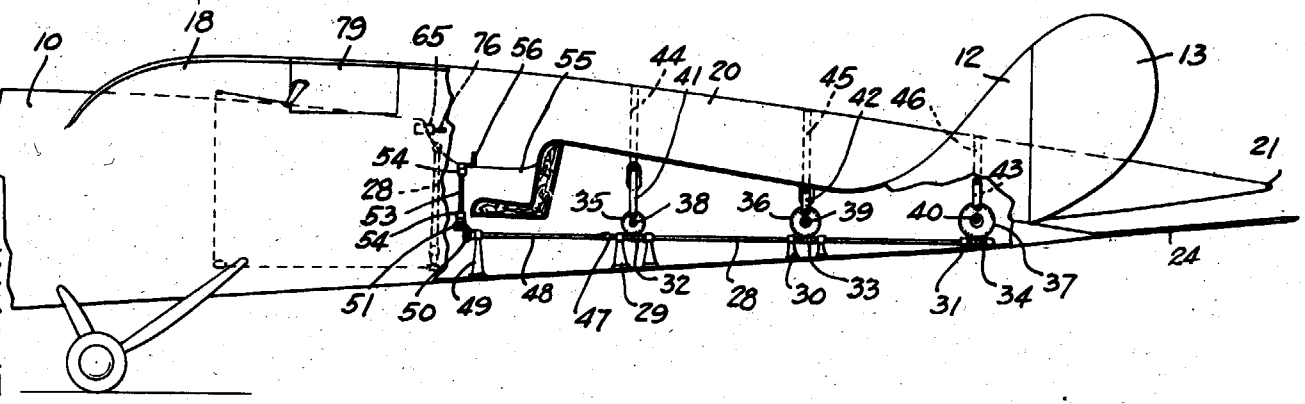
Fig. 4 is a view of the aircraft in side elevation and partly in section.

Figs. 5, 6, 7, and 8 are transverse sectional views taken, respectively, on the lines 5—5, 6—6, 7—7, and 8—8 of Fig. 1, Fig. 9 is a diagrammatic view of a hydraulic control mechanism for wing flaps embodied in the invention, Fig. 10 is a perspective view of a valve member embodied in the hydraulic control mechanism, Fig. 11 is a perspective view of the aileron controls, and Fig. 12 is an enlarged fragmentary detail view taken on the line 12—12 of Fig. 1, and illustrating the structure by which the Venturi effect is obtained.

Referring specifically to the drawings, my preferred form of aircraft embodying this invention comprises a streamlined fuselage 10 which is relatively long and narrow and merges at its tail end into a keel 11 from which projects upwardly a vertical stabilizer 12 having mounted thereon a rudder 13, the controls of which are conventional and have been omitted for the sake of clearness.

The fuselage is provided with a suitable landing gear 15, and in the present instance a single engine 16 having a direct driven tractor propeller 17 is mounted in the nose of the fuselage. However, it will be understood that by the provision of this invention, the engine can be mounted amidships without materially affecting the center of gravity or the distribution of weights on the craft.

Supported from the fuselage at a suitable angle of attack, and with a predetermined positive dihedral, are right- and left-hand wings 18—18, the chords of which preferably greatly exceed their spans so that the wings are relatively long and narrow in a direction longitudinally of the fuselage, whereby to reduce head resistance to a minimum and increase directional stability sufficiently to co-act with the fuselage and particularly its keel portion 11 in rendering the craft inherently stable.

From their leading edges to the points indicated at 19—19 the wings are rigid and are rigidly attached to the fuselage, whereas from the points 19 to their trailing edges or tips, the wings are free of the fuselage to provide portions 20 which are flexible to a limited extent.

The free portions of the wings taper to their rounded trailing edges 21, and closely follow the contour of the fuselage 10 to provide intervening narrow slots 22 between the fuselage and wings approximately to the forward end of the keel portion 11 from which the wings diverge to accommodate a horizontal stabilizer 23 and an elevator 24 pivotally mounted thereon and provided with conventional controls which are omitted for the sake of clearness. The confronting spaced edges of the wings, horizontal stabilizer and the elevator provide narrow slots 25 and 26, and it will be noted from a consideration of Fig. 12, which is a typical section across either the slots 22, 25, or 26, that the aforesaid confronting edges are preferably shaped so as to co-act in defining a venturi 27, the effect of said slots being to enable full control of the craft to be maintained at or below stalling speed, by setting up a zone of high velocity air about the control surfaces, permitting the craft to settle vertically while retaining control of the elevators. Thus, upon opening the throttle and moving the stick 28 forward to depress the elevator, forward speed can be regained without the necessity of nosing the ship downwardly.

The flexibility of the portions 20 of the wings is utilized to variably camber the wings in order to enable maximum cambering for maximum lift to be obtained to aid in the taking off or when climbing, and minimum cambering for minimum lift for high speed forward flight.

For this purpose there is shown in Figs. 1, 4, 5, 6, and 7 a manually-operable control mechanism which comprises a shaft 28 extending longitudinally and centrally in the fuselage 10, and journaled at intervals in pairs of bearings 29, 30, and 31. Fixed to the shaft 28 between the respective pairs of bearings are worms 32, 33, and 34, respectively, meshing with worm wheels 35, 36, and 37 fixed to shafts 38, 39, and 40, respectively, which shafts are journaled in suitable bearings in the fuselage.

Pivotally connected to the worm wheels 35, 36, and 37 are pairs of connecting rods 41, 42, and 43, respectively, which are connected to rigid transverse frame members 44, 45, and 46, forming part of the framework of the flexible portions 20 of the wings 18.

The forward end of the shaft 28 is connected by a universal joint 47 to a shaft 48, the forward end of which is journaled in a bearing 49 and has fixed thereto a bevel gear 50 meshing with a second bevel gear 51 fixed to a vertical shaft 53 journaled by bearings 54—54 at one side of the cockpit 55.

The upper end of the shaft 53 is provided with an operating handle 56, and it is to be noted that in order to effect a predetermined cambering of the flexible portions 20 of the wing 18, the worms 32, 33, and 34 and their mating worm wheels can be of progressively increasing pitches, or in lieu thereof, the rods 41, 42, and 43 can be connected to the respective worm wheels 35, 36, and 37 at progressively increasing distances from the center of the shafts 38, 39, and 40, respectively.

Thus it will be clear that by operation of the handle 56, the flexible portions of the wings can be variably cambered to vary the lift from a minimum for high speed forward flight to a maximum for the take-off and climbing.

Immediately forward of the flexible portions 20, the undersides of the wings 18 are provided with rectangularly-shaped recesses 57—57a in which are pivotally mounted on transverse axes, flaps 58 and 58a. These flaps are adapted to fit closely in the recesses so as to be flush with the undersurface of the wings, and are manually controlled by a suitable hydraulic mechanism (Figs. 9 and 10) to enable them to be swung downwardly independently of each other to occupy an active position.

For this purpose the pivot shafts 60 and 60a of the respective flaps 58 and 58a are extended through the opposite sides of the fuselage and have fixed thereto arms 61—61a connected to the rods 62—62a of pistons 63—63a working in hydraulic cylinders 64—64a suitably supported in fixed positions in the fuselage.

A hydraulic valve 65 includes a cylindrical body 66 to one side of which is connected at diametrically opposite locations, feed and return conduits 67 and 68 leading from opposite sides of a pump 69 constantly driven by the engine 16, a suitable spring loaded by-pass valve 70 being connected across the conduits to enable the liquid to circulate idly in the system when the valve 65 is closed.

Other conduits 71, 72, 73, and 74 are connected to the opposite side of the body 66 at circumferentially spaced locations and are connected to opposite ends of the cylinders 64—64a in the arrangement clearly shown in Fig. 9. A closure disc 75 having an operating handle 76 is rotatably mounted in the body and is provided with axial passages 77 and 77a opening at one face of the disc into arcuate channels 78 and 78a, and adapted to co-act therewith in placing either end of either the cylinder 64 or 64a in communication with the feed conduit 67 while the other end of the respective cylinder is connected to the return conduit 68, according as the disc is rotated to various positions.

Thus, either of the flaps 58 and 58a can be moved to an active position wherein the flap is disposed at an angle to the respective wing to extend downwardly and rearwardly thereof so as to destroy the lift under the respective wing from the flap to the tip of the wing, thereby enabling the craft to be slipped out of a stall and to safely execute a sharp turn about its nose as a center.

Forwardly of the flaps 58 and 58a, the wings are cut out to receive ailerons 79 and 79a provided with the conventional arrangement of cable and pulley controls 80 to the stick 28, as clearly shown in Fig. 11.

I claim as my invention:

1. In an aircraft, a fuselage; wings projecting from the sides of the fuselage; the chords of the wings greatly exceeding the spans thereof so as to reduce head resistance to a minimum; the rearward portions of the wings being free of the fuselage and being flexible in a direction to enable the camber of the wings to be varied; spars secured to said flexible portions of the wings and projecting transversely of the fuselage at spaced locations along the length thereof; a rotatably-mounted shaft extending longitudinally in the fuselage; geared connections driven by said shaft and operatively connected to said spars; and means by which said shaft can be rotated, whereby to flex said portions of the wings.

2. In an aircraft, a fuselage; wings projecting from the sides of the fuselage; the chords of the wings greatly exceeding the spans thereof so as to reduce head resistance to a minimum; the rearward portions of the wings being free of the fuselage and being flexible in a direction to enable the camber of the wings to be varied; spars secured to said flexible portions of the wings and projecting transversely of the fuselage at spaced locations along the length thereof; a rotatably-mounted shaft extending longitudinally in the fuselage; worms fixed to said shaft; worm wheels rotatably mounted and meshing with the worms; connecting rods pivotally connected to the worm wheels and spars; and means by which said shaft can be rotated, whereby to flex said portions of the wings.

3. In an aircraft, a streamlined body; wings projecting from said body; the chords of the wings greatly exceeding the spans thereof; a horizontal stabilizer projecting from the body between the wings and co-acting with the rear portions of the wings to define narrow slots therebetween of Venturi cross-section; and an elevator mounted on the body and co-acting with further rearward portions of the wings to define narrow slots therebetween of Venturi cross-section for the purpose described.

4. In an aircraft, a streamlined body; wings projecting from said body; the chords of the wings greatly exceeding the spans thereof; a horizontal stabilizer projecting from the body between the wings; an elevator mounted on the body between the wings; and means co-acting with the wings, stabilizer and elevator to cause air at a high velocity to pass therebetween should the craft assume a stalling attitude during flight, so as to enable the craft to settle vertically in the air without loss of control by the pilot.

5. In an aircraft, the combination of: a fuselage; wings projecting laterally from said fuselage, and extending rearwardly thereof; a horizontal stabilizer projecting rearwardly from said fuselage between said wings and coacting with the rear portions thereof to define relatively narrow slots therebetween of Venturi cross-section; and an elevator mounted between further rearward portions of said wings and co-acting therewith to define relatively narrow slots therebetween of Venturi cross-section for the purpose described.

6. In an aircraft, the combination of: a fuselage; wings projecting laterally from said fuselage, the chords of said wings exceeding the spans thereof; a horizontal stabilizer projecting rearwardly from said fuselage between said wings and co-acting with the rear portions thereof to define relatively narrow slots therebetween; and an elevator mounted between further rearward portions of said wings and co-acting therewith to define relatively narrow slots therebetween for the purpose described.

7. In an aircraft, the combination of: a fuselage; wings projecting laterally from said fuselage and extending rearwardly thereof; a horizontal stabilizer projecting rearwardly from said fuselage between said wings and co-acting with the rear portions thereof to define relatively narrow slots therebetween; and an elevator mounted between further rearward portions of said wings and co-acting therewith to define relatively narrow slots therebetween for the purpose described.

8. In an aircraft, the combination of: a fuselage; wings projecting laterally from said fuselage and extending rearwardly thereof, the rear portions of said wings diverging rearwardly to define a space of increasing width therebetween; and horizontally-disposed control means mounted between said rear wing portions and co-acting therewith to define narrow slots therebetween, said control means being movable in a vertical plane to vary the cross-section of said slots.

9. In an aircraft, the combination of: a fuselage; wings projecting laterally from said fuselage and extending rearwardly thereof, the rear portions of said wings being spaced apart; and horizontally-disposed control means mounted between said rear wing portions and co-acting therewith to define relatively narrow slots therebetween, said control means being movable in a vertical plane to vary the cross-section of said slots.

10. In an aircraft, the combination of: a fuselage; wings projecting laterally from said fuselage, the chords of said wings exceeding the spans thereof, the rear portions of said wings being spaced apart; and horizontally-disposed control means mounted between said rear wing portions and co-acting therewith to define relatively narrow slots therebetween, said control means being movable in a vertical plane to vary the cross-section of said slots.

11. In an aircraft, the combination of: a fuselage; wings projecting laterally from said fuselage, the chords of said wings exceeding the spans thereof, the rear portions of said wings being spaced apart; and horizontally-disposed control means mounted between said rear wing portions, said control means being movable in a vertical plane with respect to said rear wing portions, whereby the flow of air across the surfaces of said control means may be varied by movement thereof.

12. In an aircraft, the combination of: a fuselage; wings projecting laterally from said fuselage, and extending rearwardly thereof, the rear portions of said wings being spaced apart; and horizontally-disposed control means mounted between said rear wing portions, said control means being movable in a vertical plane with respect to said rear wing portions, whereby the flow of air across the surfaces of said control means may be varied by movement thereof.

13. In an aircraft, the combination of: a fuselage; wings projecting laterally from said fuselage, and extending rearwardly thereof, said wings having a relatively large positive dihedral, the rear portions of said wings being spaced apart; and horizontally-disposed control means mounted between said rear wing portions, said control means being movable in a vertical plane with respect to said rear wing portions, whereby the flow of air across the surfaces of said control means may be varied by movement thereof.

14. In an aircraft, the combination of: a fuselage; wings projecting laterally from said fuselage and extending rearwardly thereof; a horizontal stabilizer projecting rearwardly from said fuselage between said wings; an elevator mounted between said wings; and means co-acting with the wings, stabilizer, and elevator to cause air at a high velocity to pass therebetween should the craft assume a stalling attitude during flight.

15. In an aircraft, the combination of: a fuselage; wings projecting laterally from said fuselage and extending rearwardly thereof; a horizontal stabilizer projecting rearwardly from said fuselage between said wings; an elevator mounted between said wings; and means co-acting with the wings, stabilizer, and elevator to cause air to pass therebetween should the craft assume a stalling attitude during flight.

RICHARD J. THOMPSON.